US011537741B2

(12) United States Patent
Jois et al.

(10) Patent No.: US 11,537,741 B2
(45) Date of Patent: Dec. 27, 2022

(54) UNIFIED MULTI-PLATFORM SYSTEM FOR DATA PRIVACY

(71) Applicant: SAP SE, Walldorf (DE)

(72) Inventors: Sharath Jois, Bangalore (IN); Girish Sainath, Bangalore (IN)

(73) Assignee: SAP SE, Walldorf (DE)

(*) Notice: Subject to any disclaimer, the term of this patent is extended or adjusted under 35 U.S.C. 154(b) by 648 days.

(21) Appl. No.: 16/293,073

(22) Filed: Mar. 5, 2019

(65) Prior Publication Data
US 2020/0285766 A1 Sep. 10, 2020

(51) Int. Cl.
G06F 21/62 (2013.01)
G06F 21/88 (2013.01)
G06F 16/182 (2019.01)
G06F 16/93 (2019.01)

(52) U.S. Cl.
CPC ...... *G06F 21/6245* (2013.01); *G06F 16/1827* (2019.01); *G06F 16/93* (2019.01); *G06F 21/88* (2013.01)

(58) Field of Classification Search
CPC ...... G06F 21/6245; G06F 21/88; G06F 16/93; G06F 16/1827
USPC ........................................................ 726/27
See application file for complete search history.

(56) References Cited

U.S. PATENT DOCUMENTS

| | | | | |
|---|---|---|---|---|
| 9,135,319 | B2* | 9/2015 | Ritter | G06F 16/258 |
| 9,280,400 | B2* | 3/2016 | Boskovic | G06F 9/541 |
| 9,641,495 | B2* | 5/2017 | Markovich | H04L 63/08 |
| 2005/0240558 | A1* | 10/2005 | Gil | G06F 16/972 |
| 2007/0123229 | A1* | 5/2007 | Pousti | H04M 15/53 |
| | | | | 455/414.1 |
| 2008/0275843 | A1* | 11/2008 | Lal | G06F 21/6227 |
| 2010/0287213 | A1* | 11/2010 | Rolls | G16H 10/60 |
| | | | | 707/803 |
| 2013/0073389 | A1* | 3/2013 | Heath | G06Q 30/02 |
| | | | | 705/14.54 |
| 2013/0073473 | A1* | 3/2013 | Heath | G06Q 30/0241 |
| | | | | 705/319 |
| 2014/0181322 | A1* | 6/2014 | Schmitt | H04L 67/60 |
| | | | | 709/250 |
| 2014/0201331 | A1* | 7/2014 | Kershaw | H04L 41/509 |
| | | | | 709/219 |
| 2016/0004724 | A1* | 1/2016 | Har-Noy | G06F 16/23 |
| | | | | 709/219 |

(Continued)

OTHER PUBLICATIONS

NPL Search Terms (Year: 2021).*
NPL Search Terms (Year: 2022).*

*Primary Examiner* — Syed A Zaidi
(74) *Attorney, Agent, or Firm* — Fountainhead Law Group P.C.

(57) ABSTRACT

A data manager in an enterprise provides data management of users' personal data, which is used by enterprise applications to support operations in the enterprise. The data manager obtains personal data from the enterprise applications via the use of corresponding connector modules. The data manager communicates with each connector module, which then communicates with its corresponding enterprise application to obtain personal data used by that application. The data manager can also communicate with a central database that can store personal data used by the enterprise applications. The central database can serve as a central store of personal data for the enterprise applications.

20 Claims, 13 Drawing Sheets

(56) References Cited

U.S. PATENT DOCUMENTS

| | | | |
|---|---|---|---|
| 2016/0378868 A1* | 12/2016 | Har-Noy | G06Q 50/01 707/706 |
| 2017/0140174 A1* | 5/2017 | Lacey | G06Q 20/4016 |
| 2017/0154083 A1* | 6/2017 | Sundaram P | G06Q 10/063 |
| 2020/0210612 A1* | 7/2020 | Saad | G06F 3/0649 |

* cited by examiner

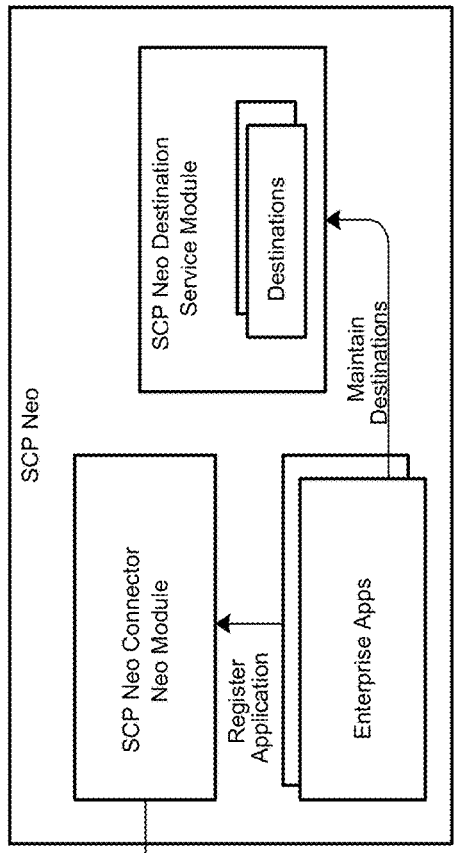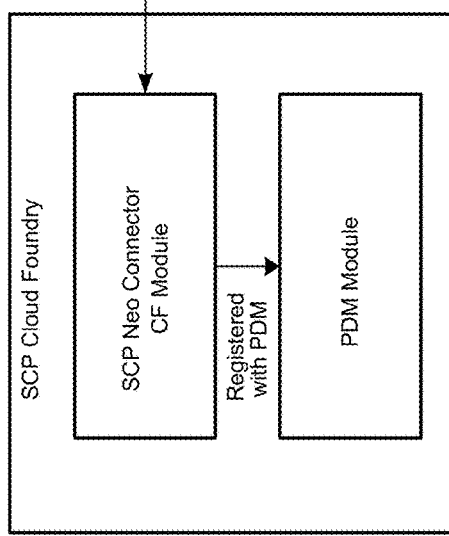
FIG. 1A
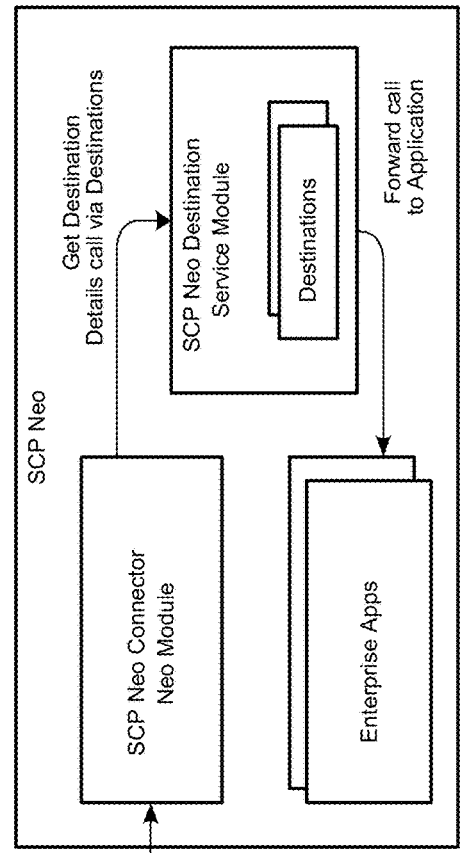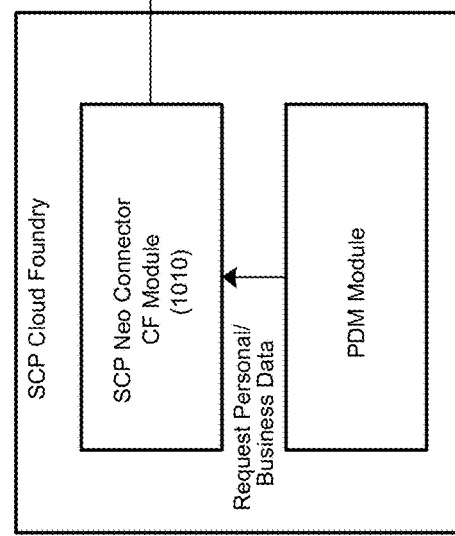
FIG. 1B

US 11,537,741 B2

UNIFIED MULTI-PLATFORM SYSTEM FOR DATA PRIVACY

BACKGROUND

The increasing occurrence of data breaches in large business enterprises and the resulting theft of sensitive personal data has initiated many efforts in data security. The European Union's General Data Protection Regulation (GDPR), for example, is an approach that is forcing business in the EU to rethink how they collect, manage and govern access to personal data. A large enterprise can have multiple independent business platforms that their customers and suppliers use, and as such their personal data can become spread across those various business platforms. The challenge of managing personal data in these business environments is amplified because each business platform can have its own disparate set of tools/applications and policies for securing the private data that they are entrusted with.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art of how embodiments in accordance with the present disclosure may be practiced. Similar or same reference numbers may be used to identify or otherwise refer to similar or same elements in the various drawings and supporting descriptions. In the accompanying drawings:

FIGS. 1A, 1B, 1C illustrate specific use cases of a connector module.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
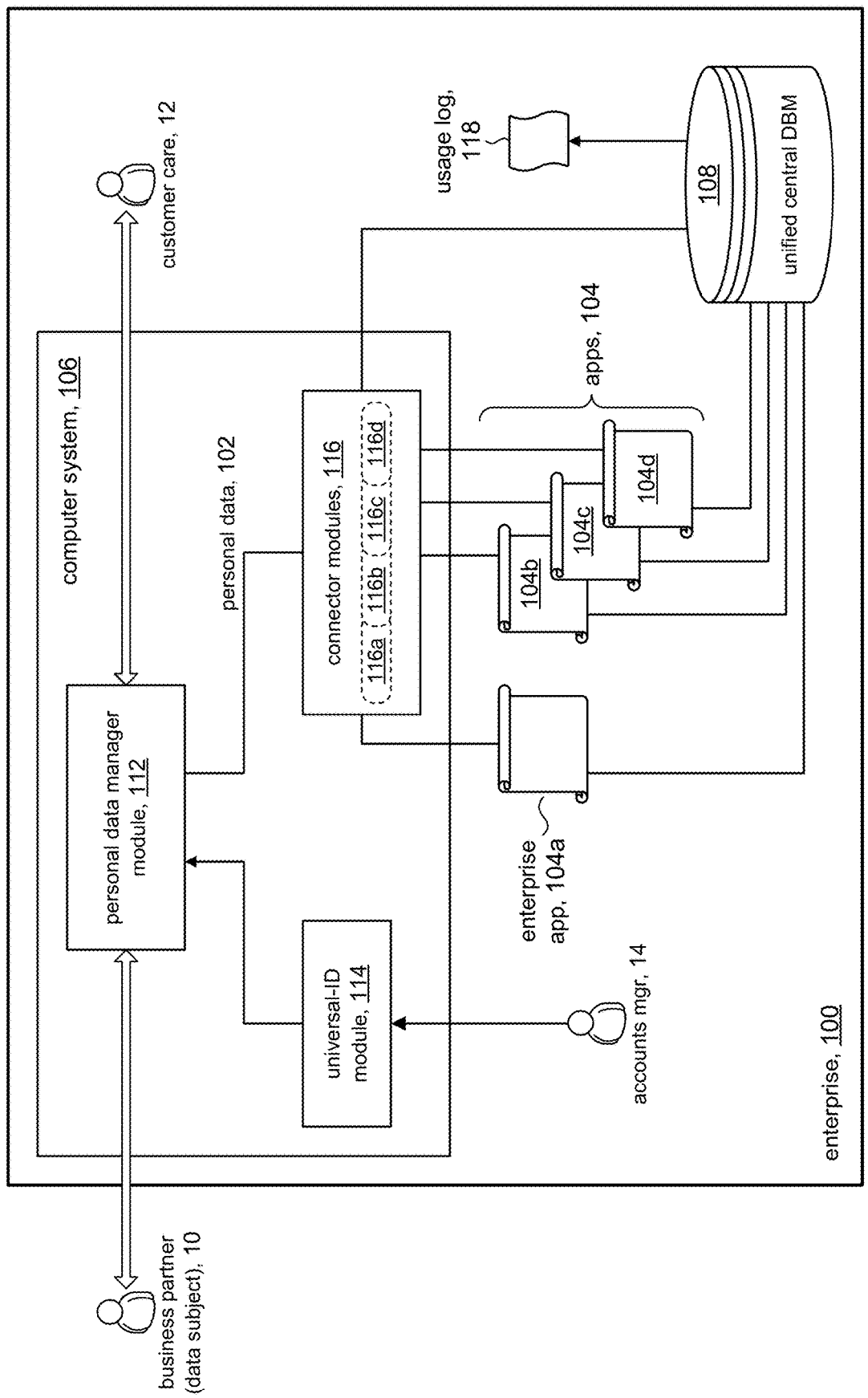
FIG. 1 illustrates an example of a system in accordance with the present disclosure.

FIG. 1 illustrates a system for the management of personal data 102 in an enterprise 100 in accordance with embodiments of the present disclosure. In various embodiments, enterprise 100 can include enterprise applications (apps) 104a, 104b, 104c, 104d (collectively referred to by reference numeral 104) to provide services and/or product support for its customers 10, including for example, online shopping services, order processing, and the like. Enterprise apps 104 can also include applications (software solutions) to support operations within enterprise 100. For example, the SAP® S/4 HANA® business suite includes, among other things, enterprise resource planning (ERP) capability to cover day-to-day processes of an enterprise (e.g., order-to-cash, procure-to-pay, plan-to-product, and request-to-service) and other core capabilities. The SAP Concur® enterprise software can include, among other things, travel and expense management services. The SAP Successfactors® software provides services such as, but not limited to, database management and data warehousing, and human resources (HR) management services; and so on with other enterprise applications.

Enterprise apps 104 may require various personal data in order to perform their functions. For example, online shopping services may require the customer's contact information (e.g., phone number, email address, physical address) and billing information (e.g., credit card information, government identification information such as social security number, and so on). An HR service typically stores information for employees of the enterprise, such as name, address, date of birth, emergency contacts, and the like. An ERP service can store information for suppliers and service providers (collectively, providers) of enterprise 100, such as contracts, service agreements, bank account information for bill payment, and so on. The term "personal data" will be used herein to refer to such information, irrespective of whether the information is associated with a natural (human) customer of enterprise 100 or is associated with a provider (company or organization) of the enterprise. It can be appreciated that much of the information collected, stored, and used by enterprise apps 104 can be deemed to be highly sensitive, and thus should be treated accordingly within enterprise 100.

In some embodiments according to the present disclosure, enterprise 100 can include a computer system 106 to manage the personal data of customers and providers of the enterprise. In some embodiments, for example, computer system 106 can include a personal data manager (PDM) module 112, a universal-ID module 114, and a connector module 116, which are discussed in further detail below. Briefly, PDM module 112 can be an instantiated process that executes on computer system 106 to provide a common point of access to business partner 10 for their personal data. A "business partner" can be any entity affiliated with enterprise 100, such as customers of the enterprise, providers or suppliers of the enterprise, employees and so on. In some contexts, business partner 10 can be referred to as a "data subject." For example, the General Data Protection Regulation (GDPR) refers to such individuals as data subjects in the GDPR. In some embodiments, PDM module 112 can also be used by a customer care agent 12 of enterprise 100 to support its business partners.

Universal-ID module 114 can be an instantiated process that executes on computer system 106 to provide universal identifiers for business partners 10. As discussed below, universal identifiers can be used to identify business partners 10 across the enterprise applications used in enterprise 100. When a business partner is added to the system (e.g., a new customer or a new provider), an accounts manager 14 can create a new entry in universal-ID module 114 for that new business partner.

Connector modules 116 can be instantiated processes that execute on computer system 106 to interact with enterprise apps 104. In some embodiments, each enterprise app 104a, 104b, 104c, 104d can be associated with a respective corresponding connector module 116a, 116b, 116c, 116d that executes on computer system 106. In other embodiments (not shown), one connector module may be configured to interact with two or more enterprise applications. Without loss of generality, the configuration shown in the figures will be used for the remaining discussion, where connector modules 116 correspond in one-to-one relation with respective enterprise apps 104.

In some embodiments according to the present disclosure, enterprise 100 can include a unified central database manager (DBM) 108 to provide a repository of personal data of customers and providers of the enterprise. In some embodiments, central DBM 108 can maintain a usage log 118 of updates and accesses to its stored personal data.

Figure 2:
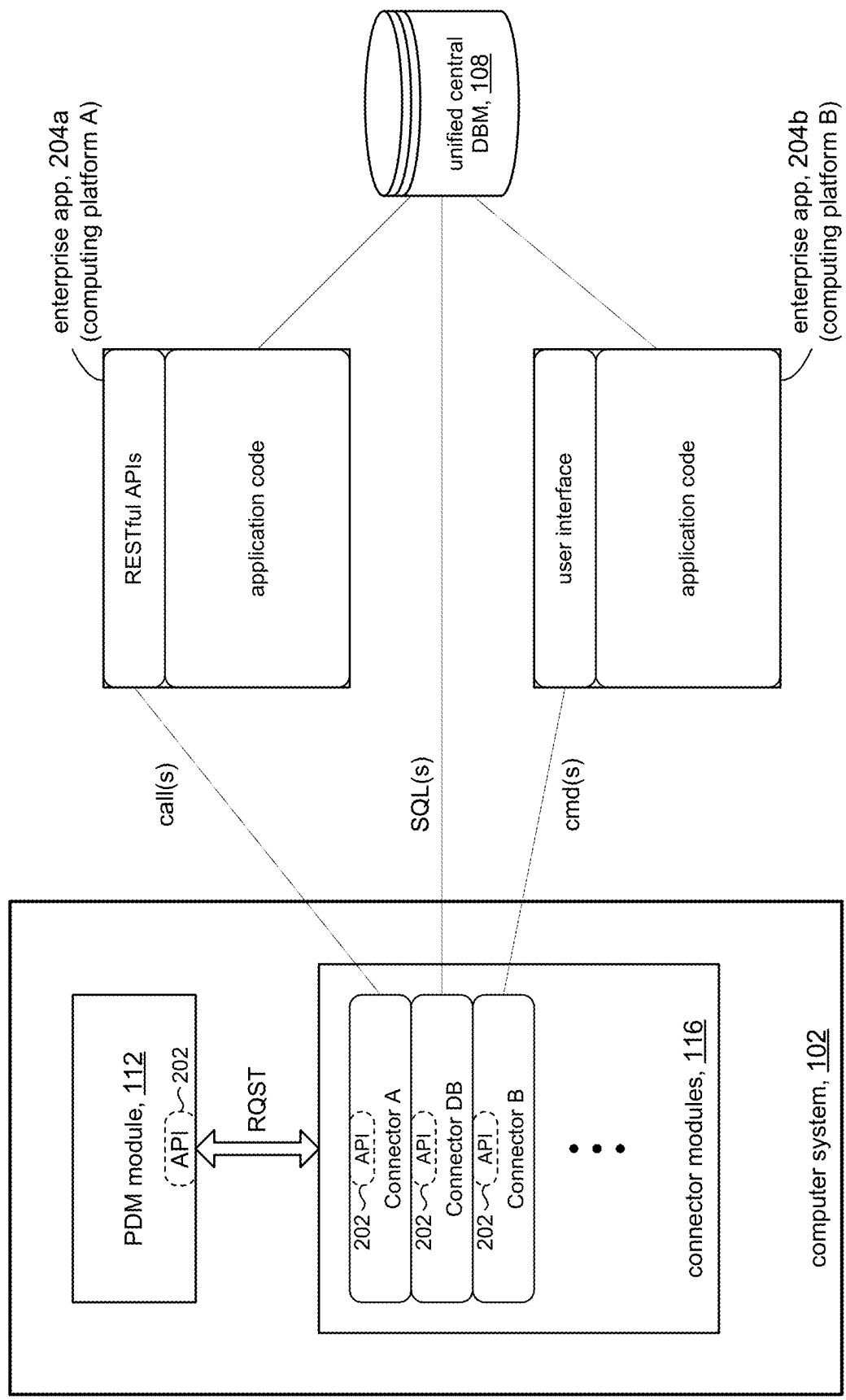
FIG. 2 illustrates connector module details in accordance with some embodiments of the present disclosure.

FIG. 2 illustrates details of connector modules 116 in accordance with some embodiments. In an enterprise, various business solutions (e.g., HR, ERP, and so on) can be purchased from different vendors. As such, some enterprise apps 204a, 204b can be implemented on computer systems or computing platforms separate from computer system 106 of PDM module 112. In accordance with the present disclosure, connector modules 116 can be hosted on the same computing platform (e.g., computer system 102) so that PDM module 112 need not be aware of the computing platforms on which enterprise apps 204a, 204b execute. The use of connector modules 116 allow PDM module 112 to communicate with the enterprise applications (e.g., 204a, 204b) even though the enterprise apps execute on different and separate computing platforms; e.g., the PDM module can be server based and an enterprise can be cloud based.

Each of the connector modules 116 can communicate with the PDM module 112 using the same API 202 defined between the connector module and PDM module. API 202 can define a set of commands for reading, writing, and otherwise managing personal data. Using API 202, the PDM module 112 can access personal data stored in the enterprise apps, via respective corresponding connector modules 116, irrespective of the specifics of how the personal data is obtained from the enterprise apps. The PDM module 112 therefore does not require separate communication logic configured for each enterprise application. FIG. 2 shows some examples of connector modules 116 to illustrate this point; Connector A can interact with enterprise app 204a and Connector B can interact with enterprise app 204b.

Connector modules 116 can communicate with their corresponding enterprise applications using any suitable communication paradigm. In some instances, for example, an enterprise application (e.g., 204a) may employ the Representational State Transfer (REST) programming paradigm to define a RESTful application program interface (API) comprising HTTP requests, such as GET, PUT, POST and DELETE, to access personal data used by the enterprise application. Accordingly, a corresponding connector module (e.g., Connector A) can include a RESTful API in order to communicate/interact with enterprise application 204a on behalf of PDM module 112 to read out personal data used by the enterprise application. In some instances, the Open Data Protocol (OData) can be used to define the creation and consumption of queryable and interoperable RESTful APIs.

In other instances, a connector module can include an API to interact with an enterprise application that does not support communication paradigms such as REST, ODATA, and the like. For example, such an enterprise application may be a legacy system. In such cases, the corresponding connector module can be configured to programmatically interact with the enterprise application. If the enterprise application (e.g., 204b) employs a command line interface (CLI), for instance, the connector module (e.g., Connector B) can be configured with logic that issues commands to the CLI of the enterprise application to access personal data. In accordance with some embodiments, a connector module (e.g., Connector DB) can be provided that includes a database API to access the central DBM 108 so that the PDM module 112 can use the same API 202 to access the central DBM without having to be configured with separate logic for communicating with the central DBM.

FIGS. 1A and 1B illustrate a solution in a particular implementation on the SAP® SCP Neo cloud computing platform for the communication of a PDM (personal data management) module with enterprise applications (enterprise apps) using connector modules on either platform. FIG. 1A shows the enterprise integration with the PDM and FIG. 1B shows the PDM invoking the enterprise app. Enterprise apps available on the SCP Neo cloud computing platform can either cater for a single customer (single-tenant solution) or can cater for multiple customers (multi-tenant solution) with a single deployed solution. In order to understand the context of the enterprise app and the customer (tenant), a connector module can be deployed on either platform (SCP Neo Connector CF Module and SCP Neo Connector Neo Module). We can leverage the concept of "destinations" and a destination service that is available in SCP Neo to communicate to various different enterprise applications that are available any platform. Destinations hold the configuration information about how to reach a target system and information about what kind of authentication is required to successfully call to the target system along with the necessary information for obtaining this required authentication. Customers can register their application with the Connector module on SCP Neo and maintain their Destinations in SCP Neo and also maintain the tenant information in the Connector Module on SCP CF. The PDM module can call the connector modules on SCP CF and this call is forwarded to the connector module on SCP Neo, and the connector module on SCP Neo would communicate with the destination service and call the application via these configured destinations.

Figure 1C:
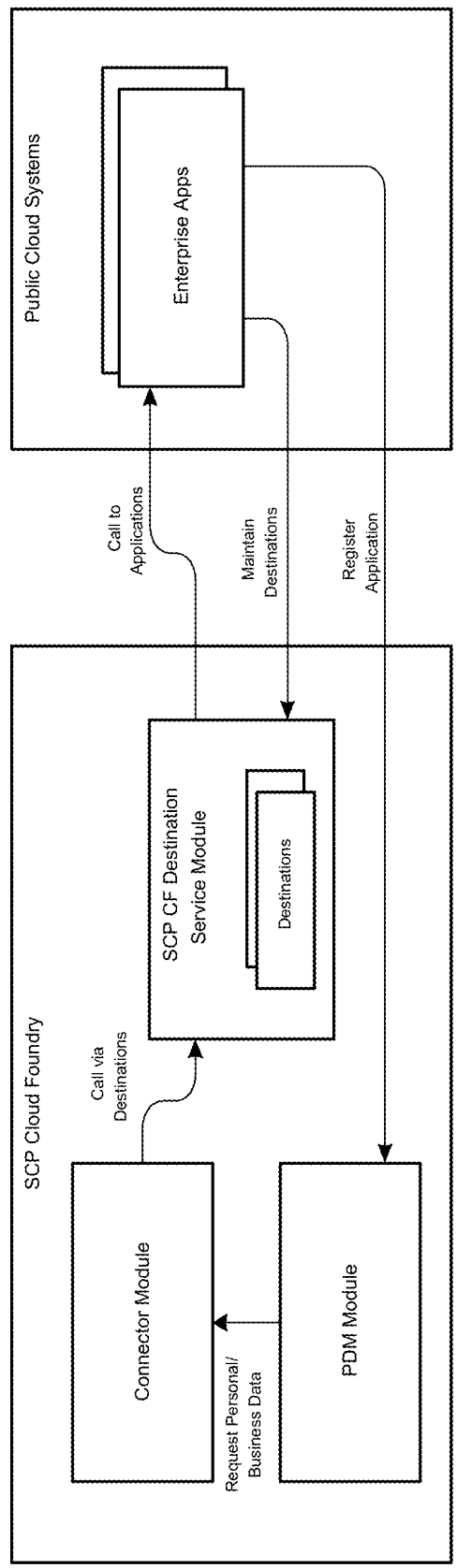

FIG. 1C illustrates another solution in a particular implementation for the communication of the PDM with enterprise apps on any public cloud system with the use of a connector module. We can leverage the concept on destinations and the destination service that is available in SCP CF to communicate to various different enterprise applications that are available on any platform. Enterprise apps maintain destinations with the destination service and register the application with PDM. The PDM module would call the connector module and the connector module would communicate with the destination service and call the application via these configured destinations.

FIG. 2 illustrates, in some embodiments, connector modules 116 can include a connector module "Connector DB" for communicating with central DBM 108. In some embodiments, for example, central DBM 108 can include any suitable organization of data such as a relational database, and Connector DB can be configured to use the structured query language (SQL) to store, retrieve, update, and delete data stored in the database. These aspects of the connector modules discussed further below.

In accordance with the present disclosure, enterprise apps 2040a, 204b can communicate with central DBM 108 to access personal data stored by the central DBM. For example, an enterprise application can query central DBM 108 to initialize its local data structures with personal data for a given business partner. Enterprise applications can use central DBM 108 as a persistent data storage service for personal data. Enterprise applications can manage the personal data (e.g., modify, delete) stored in central DBM 108, and so on. Since the personal data is stored in a central location and is thereby accessible by all enterprise applications, any changes made to the data by a given enterprise application (e.g., new billing address, new credit card number, etc.) are effectively propagated to all the other enterprise applications. This avoids the effort of the business partner (or a customer care agent) having to make the same change in each enterprise application that uses that particular data. Enterprise applications can avoid mistakes due to having outdated information, because central DBM 108 contains the most current information.

Figure 3:
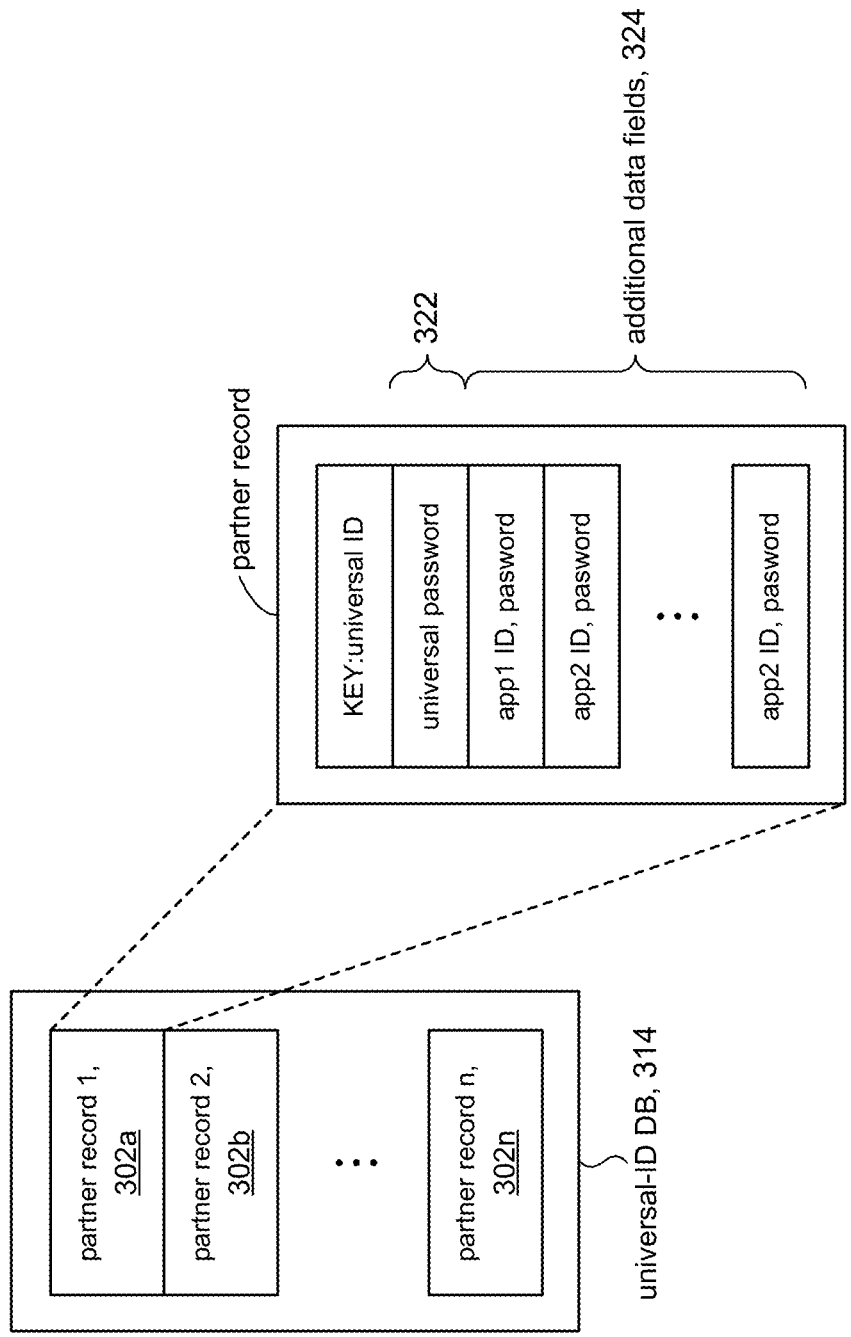
FIG. 3 illustrates details of a universal ID database in accordance with some embodiments of the present disclosure.

FIG. 3 illustrates an example of information that can be stored in universal-ID module 114 (FIG. 1), in accordance with some embodiments. For instance, universal-ID module 114 can include a universal-ID DB 314 that stores universal IDs of business partners in enterprise 100, including customers of the enterprise and providers/suppliers of the enterprise. Universal-ID DB 314 can be a relational database comprising partner records 302a, 302b, . . . 302n, for example, where the partner records are keyed using the business partners' universal IDs. Each business partner has a corresponding partner record. A partner record can include a universal password 322 of the business partner, and one or more additional data fields 324 corresponding to each enterprise application (e.g., enterprise apps 104, FIG. 1) that the business partner is associated with. Enterprise apps 104 are typically independent of each other and so business partners may have different login IDs and passwords for each application. Different enterprise applications may have different requirements or restrictions on how the login ID is formed (e g, minimum or maximum number of characters, restrictions on characters that can be used or that must be used, and so on), and likewise for passwords. Accordingly, each additional data field can include an application-specific identifier of the business partner used to gain access to the corresponding enterprise application, and a corresponding password. For example, a customer of the enterprise may be associated with a billing application and an order processing application. The partner record in universal-ID DB 314 for that business partner can include a data field that stores a user ID and a password used to log onto the billing application, and another user ID and password for logging onto the order processing application.

Figure 4:
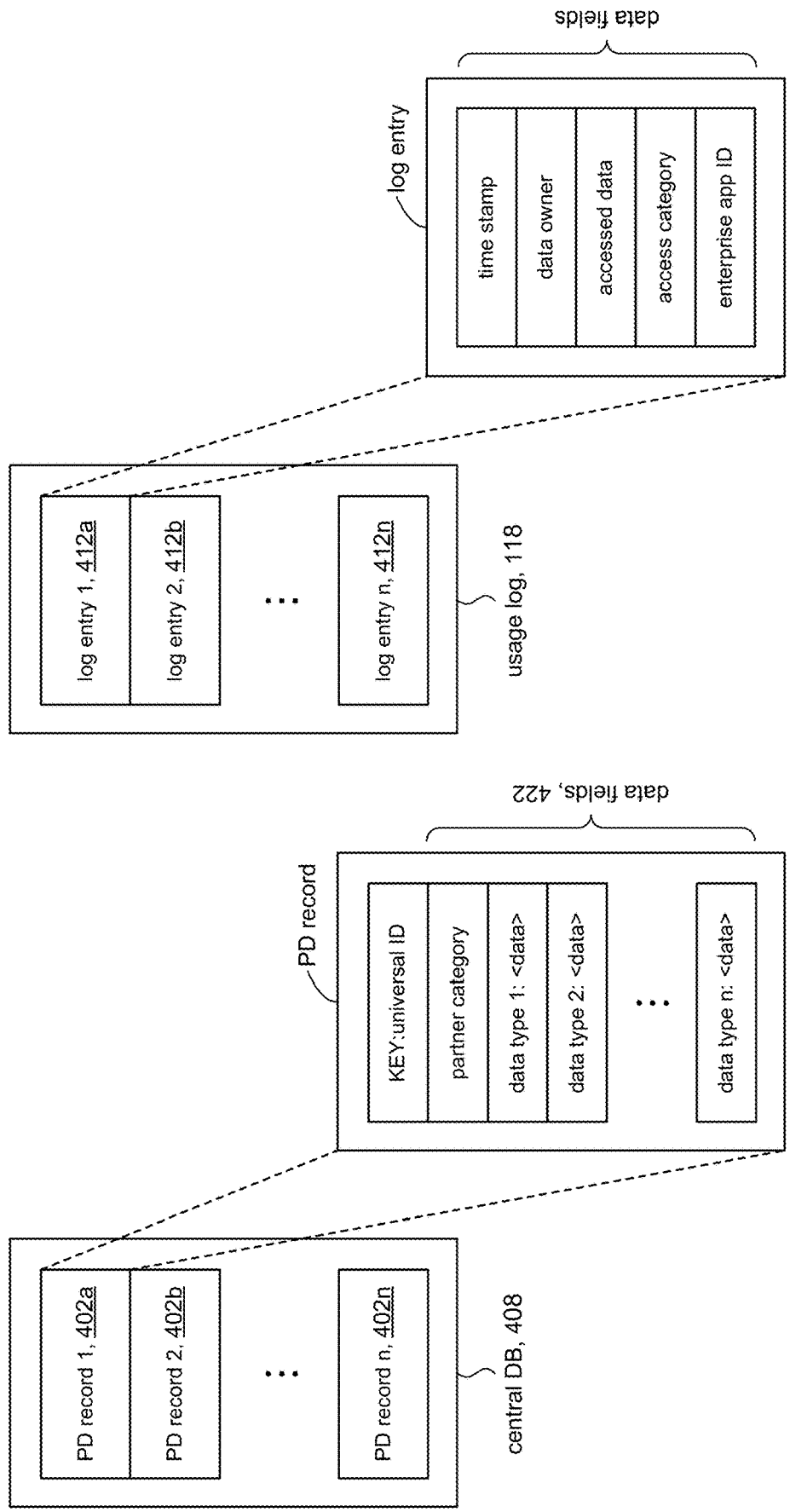
FIG. 4A illustrates details of a central database in accordance with some embodiments of the present disclosure.
FIG. 4B illustrates details of a usage log in accordance with some embodiments of the present disclosure.

FIGS. 4A and 4B illustrate an example of a central DB 408 that can be managed by central DBM 108 (FIG. 1) in accordance with some embodiments. Referring to FIG. 4A, business partners can have corresponding personal data (PD) records 402a, 402b, . . . 402n in central DB 408. Central DB 408 can serve as a consolidated/single source of all the personal data stored about a business partner across enterprise apps 104 that the business partner is associated with. In some embodiments, each PD record can be keyed by the universal ID of the business partner, and can include several data fields 422. A data field can be used to identify the category of the business partner, whether they are a customer of enterprise 100, a provider/supplier of the enterprise, an employee, and so on. A data field can store each item of personal data, for example, by storing a data type of the item and the data itself. Data types can be codes that indicate the category of data being stored, for example, name, address, phone number, email address(es), sex, age, profession, automobile license number, and so on.

Generally, personal data can be any information relating to an identified or identifiable natural person ("data subject"); an identifiable natural person is one who can be identified, directly or indirectly, in particular by reference to an identifier such as a name, an identification number, location data, an online identifier or to one or more factors specific to the physical, physiological, genetic, mental, economic, cultural or social identity of that natural person, etc. Personal identifiable information is any information that can serve a person, and can include names (full name, nickname, etc.), places (home address, place of birth, vacation place, etc.), dates (birthday/age, wedding day, etc.), technical address (email address, IP address, phone number, etc.), identification numbers (passport number, social number, car number, driving license, credit card number, bank account, etc.), relation to others (family, company, friends, etc.), images, gender, graduation, etc.

Different kinds of personal data may be stored depending on who the business partner is. For example, personal data for a customer may include credit card information, purchasing preferences, transactional data, and so on. A provider/supplier (e.g., company, organization) may include banking information, contact persons, and so on. Employee's private data can include date of birth, government identification (e.g., social security number), marital status, familial demographics, insurance information, and the like.

FIG. 4B shows an example of usage log 118 (FIG. 1). In some embodiments, central DBM 108 can record accesses made to its database by recording the accesses in log entries 412a, 412b, etc. 412n in usage log 118. In some embodiments, a log entry can include a timestamp data field that indicates a time when the access was made. A data owner can identify (e.g., using the universal ID) the owner of the data that was accessed. The log entry can store a copy of the accessed data. An access category can identify the type of access; e.g., read, write, modify, delete, etc. The log entry can store an identifier of the enterprise application that made the data access.

Figure 5:
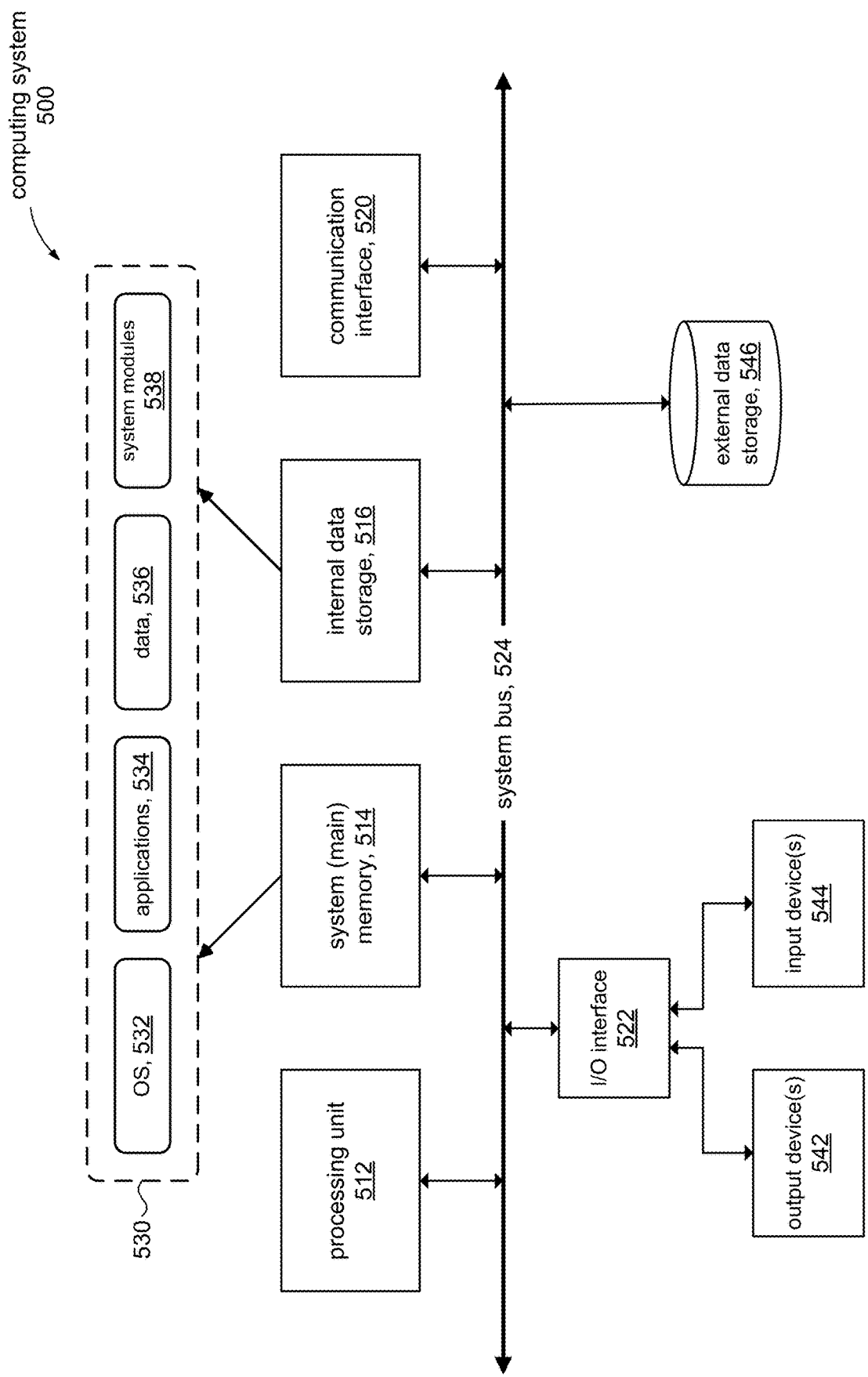
FIG. 5 illustrates an example of a computer system in accordance with some embodiments of the present disclosure.

FIG. 5 is a simplified block diagram of an illustrative computing system 500 for implementing one or more of the embodiments described herein (e.g., computer system 106, FIG. 1). The computing system 500 can perform and/or be a means for performing, either alone or in combination with other elements, operations in accordance with the present disclosure. Computing system 500 can also perform and/or be a means for performing any other steps, methods, or processes described herein.

Computing system 500 can include any single- or multi-processor computing device or system capable of executing computer-readable instructions. Examples of computing system 500 include, for example, workstations, laptops, servers, distributed computing systems, and the like. In a basic configuration, computing system 500 can include at least one processing unit 512 and a system (main) memory 514.

Processing unit 512 can comprise any type or form of processing unit capable of processing data or interpreting and executing instructions. The processing unit 512 can be a single processor configuration in some embodiments, and in other embodiments can be a multi-processor architecture comprising one or more computer processors. In some embodiments, processing unit 512 can receive instructions from program and data modules 530. These instructions can cause processing unit 512 to perform operations in accordance with the various disclosed embodiments (e.g., FIGS. 6, 7) of the present disclosure.

System memory 514 (sometimes referred to as main memory) can be any type or form of storage device or storage medium capable of storing data and/or other computer-readable instructions and comprises volatile memory and/or non-volatile memory. Examples of system memory 514 include any suitable byte-addressable memory, for example, random access memory (RAM), read only memory (ROM), flash memory, or any other similar memory architecture. Although not required, in some embodiments computing system 500 can include both a volatile memory unit (e.g., system memory 514) and a non-volatile storage device (e.g., data storage 516, 546).

In some embodiments, computing system 500 can include one or more components or elements in addition to processing unit 512 and system memory 514. For example, as illustrated in FIG. 5, computing system 500 can include internal data storage 516, a communication interface 520, and an I/O interface 522 interconnected via a system bus 524. System bus 524 can include any type or form of infrastructure capable of facilitating communication between one or more components comprising computing system 500.

Internal data storage 516 can comprise non-transitory computer-readable storage media to provide nonvolatile storage of data, data structures, computer-executable instructions, and so forth to operate computing system 500 in accordance with the present disclosure. For instance, the internal data storage 516 can store various program and data modules 530, including for example, operating system 532, one or more application programs 534, program data 536, and other application/system modules 538 to implement PDM module 112 and connector modules 116, and to support and perform various processing and operations disclosed herein.

Communication interface 520 can include any type or form of communication device or adapter capable of facilitating communication between computing system 500 and one or more additional devices. For example, in some embodiments communication interface 520 can facilitate communication between computing system 500 and a private or public network including additional computing systems. Examples of communication interface 520 include, for example, a wired network interface (such as a network interface card), a wireless network interface (such as a wireless network interface card), a modem, and any other suitable interface.

In some embodiments, communication interface 520 can also represent a host adapter configured to facilitate communication between computing system 500 and one or more additional network or storage devices via an external bus or communications channel.

Computing system 500 can also include at least one output device 542 (e.g., a display) coupled to system bus 524 via I/O interface 522, for example, to provide access to an administrator. The output device 542 can include any type or form of device capable of visual and/or audio presentation of information received from I/O interface 522.

Computing system 500 can also include at least one input device 544 coupled to system bus 524 via I/O interface 522, e.g., for administrator access. Input device 544 can include any type or form of input device capable of providing input, either computer or human generated, to computing system 500. Examples of input device 544 include, for example, a keyboard, a pointing device, a speech recognition device, or any other input device.

Computing system 500 can also include external data storage subsystem 546 coupled to system bus 524. In some embodiments, the external data storage 546 can be accessed via communication interface 520. External data storage 546 can be a storage subsystem comprising a storage area network (SAN), network attached storage (NAS), virtual SAN (VSAN), and the like. External data storage 546 can comprise any type or form of block storage device or medium capable of storing data and/or other computer-readable instructions. For example, external data storage 546 can be a magnetic disk drive (e.g., a so-called hard drive), a solid state drive, a floppy disk drive, a magnetic tape drive, an optical disk drive, a flash drive, or the like. In some embodiments, central DB 408 in FIG. 4 can comprise external data storage subsystem 546.

Figure 6:
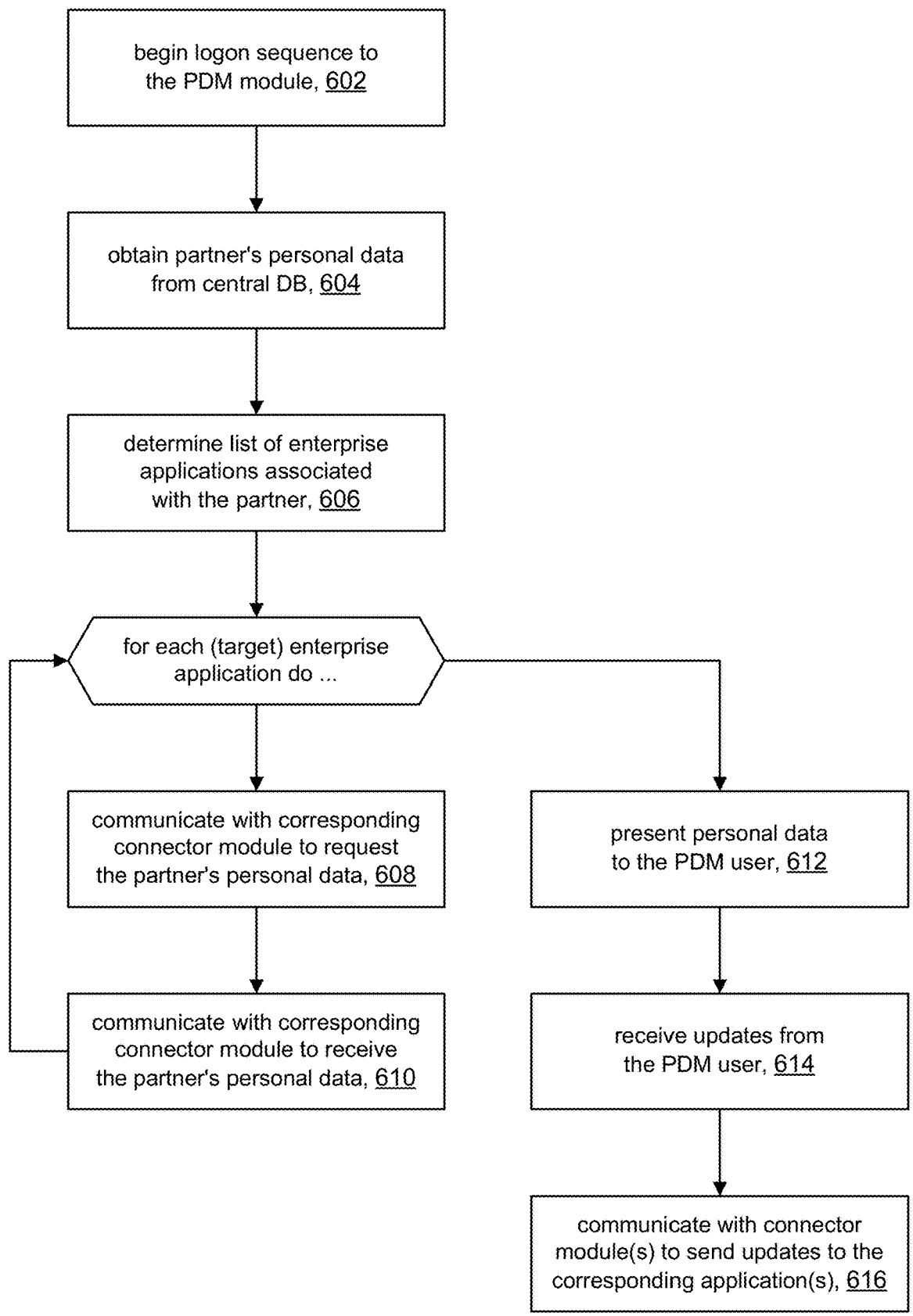
FIG. 6 illustrates processing in accordance with some embodiments of the present disclosure.

Referring to FIG. 6, the discussion will now turn to a high level description of processing in computer system 106 (FIG. 1) for managing personal data in accordance with the present disclosure. In some embodiments, for example, computer system 106 can include computer executable program code, which when executed by a processor (e.g., 512, FIG. 5), may cause the computer system to perform the processing in accordance with FIG. 6. The flow of operations performed by the computer system is not necessarily limited to the order of operations shown.

Figure 8A:
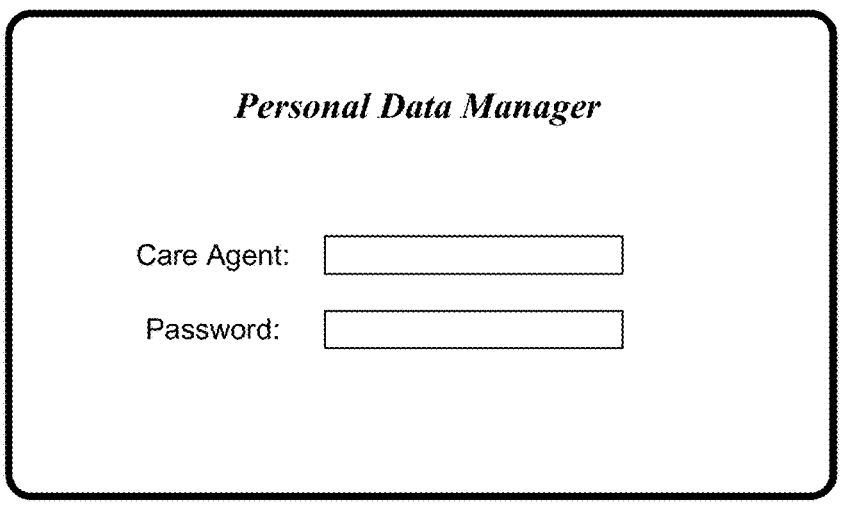
Figure 8B:
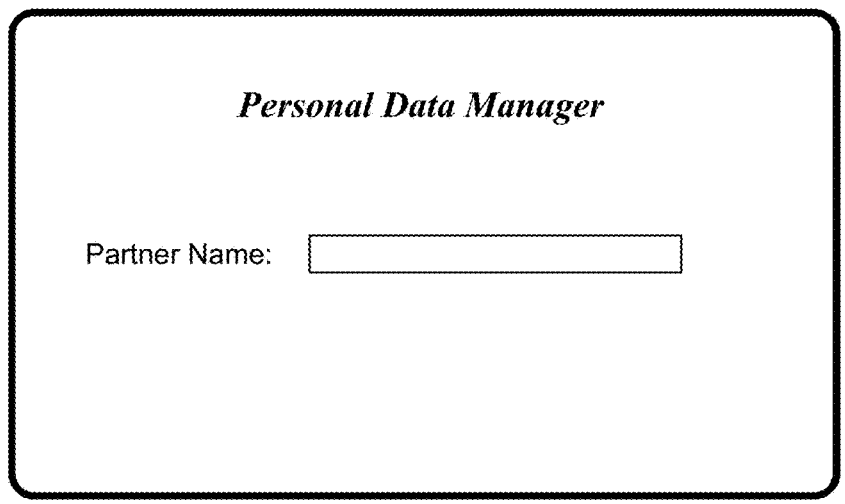

At operation 602, the computer system can begin a logon sequence for a PDM user to begin the process of managing a business partner's personal data; for example, using PDM module 112. In some instances, the PDM user can be the business partner themselves, using the PDM module to manage their own personal data. In other instances, customer care agent 12 can be the PDM user who uses the PDM module to manage a business partner's personal data on behalf of that business partner. In the case of a business partner, they can login in with their universal ID (FIG. 3) and the PDM module can use the universal ID to access a partner record from universal-ID module 114. The business partner can be authenticated by comparing the universal password in the accessed partner record with a password entered by the business partner. The login and password information for care agents may be stored separately from universal-ID module 114. Additional detail for logging in a care agent is illustrated in FIGS. 8A, 8B below.

At operation 604, the computer system can obtain the business partner's personal data from central DB 408, for example, using the universal ID as a search key to access the business partner's PD record (FIG. 4A). In some embodiments, for example, the PDM module can communicate with central DBM 108 (e.g., using a suitable connector module, such "Connector DB" illustrated in FIG. 2) to read in personal data for the business partner. Some enterprise applications, however, may have personal data that is not stored in central DB 408; e.g., legacy applications may not be configured to communicate with central DBM 108. Accordingly, in some embodiments, beginning with operation 606, the computer system can interact with each enterprise application to obtain personal data stored by that enterprise application.

Enterprise apps 104a can refer to existing business partners in the central DB 408 or they create a new business partner in the central DB 408 (e.g., using REST APIs supported by the central DB) whilst the business partner is doing business using the enterprise app. Enterprise apps may also choose to maintain a cache of the business partner details (basic details) necessary for local reporting but would always sync with the central DB prior to processing of the personal data of the business partner. In this scenario, even the local cache maintained in the enterprise app must also be reported to the PDM module. In another scenario, some legacy enterprise apps may not even use the central DB to manage their business partner but could have a business partner management of their own or could use another business partner management available in their local environment which is not synced with the central DB. These are a couple of scenarios where the connector module would have to communicate with the enterprise apps directly to get the personal data.

At operation 606, the computer system can determine or otherwise identify a list of enterprise applications that the business partner is associated with. In some embodiments, this information can be provided in universal-ID database 314. The business partner's corresponding partner record can include data fields that identify the enterprise applications and respective login names and passwords. For each enterprise application (referred to as the "target application"), the computer system can perform operations 608 and 610 to obtain the personal data.

At operation 608, the computer system can communicate with the target application using the connector module corresponding to the target application. In some embodiments, for example, the PDM module can communicate with the connector module to request the business partner's personal data from the target application, including providing the login name and password obtained in operation 606. The connector module, in turn, can communicate with the target application to fulfill the request. The connector module can convert the request from the PDM module into one or more transactions with its corresponding target application, including logging into the target application using the login and password information by the PDM module. For example, the target application may have an API that the connector module can use to obtain the business partner's personal data. In some instances, the API may define a single function call (method) configured specifically to provide all the personal data, in which case the connector module need only to invoke the single function. In other instances, the API may define several function calls to obtain individual portions of the personal data; e.g., get-address( ), get-contact-info( ), get-credit-card-number( ), and so on, in which case the connector module may make several invocations. In the case of a legacy application, the connector module may be configured to simulate a user logging on to the application, and then simulate the user pulling up the personal data, for example, by issuing a series of commands to the legacy application. In a particular implementation, for example, there is the concept of "Destinations" and a "Destination Service" that helps manage these Destinations. Destinations hold the configuration information about how to reach a target system; e.g., the URL to the target system can be maintained here. Additionally, Destinations can hold information about what kind of authentication is required to successfully call to the target system along with the necessary information for obtaining this required authentication. Connector modules would communicate with the Destination service and call the application via these configured Destinations.

At operation 610, the computer system can receive the requested personal data from the target application. In some embodiments, for example, the connector module can communicate the personal data it obtained from the target application to the PDM module. Processing can return to operation 608 to obtain personal data from the next enterprise application that is associated with the business partner. After the PDM module has accessed personal data from each enterprise application using its corresponding connector, processing can continue to operation 612.

At operation 612, the computer system can present the business partner's personal data. In some embodiments, for example, the PDM module can present the personal data in a suitable user interface (UI). The UI provides a single point of access to the business partner's personal data, without requiring the PDM user (e.g., business partner, customer care agent) to access each enterprise application.

At operation 614, the computer system can receive updates from the PDM user. In some embodiments, for example, the PDM module can be configured to allow the PDM user to update the business partner's personal data, such as adding personal data, modifying personal data, changing permissions, and so on.

At operation 616, the computer system can communicate with the connector module(s) to send updates to the enterprise applications. In some embodiments, for example, the PDM module can communicate with each connector module that corresponds to the enterprise application for which an update is to be sent. The connector modules enable the use of a single component, namely the PDM module, to manage a business partner's personal data across all the enterprise applications that the business partner is associated with.

The discussion will now turn to descriptions of illustrative user interfaces for the management of personal data in accordance with the present disclosure. It will be appreciated of course, that the user interfaces described herein are purely illustrative.

Figure 7:
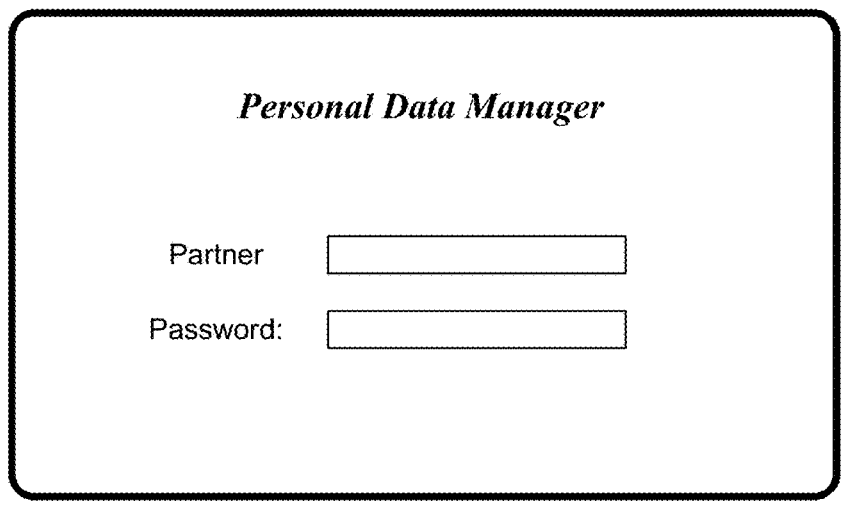
FIGS. 7, 8A, 8B illustrate examples of login screen in accordance with some embodiments of the present disclosure.

FIG. 7 shows an illustrative login screen for PDM module 112 for a business partner, such as customer 10 of enterprise 100 or a provider/supplier of the enterprise, to allow the partner to manage their personal data. The partner can enter their universal ID (FIG. 3) and PDM module 112 can use that information to authenticate the partner, as described above.

FIGS. 8A and 8B show illustrative login screens for customer care agent 12 to manage the personal data on behalf of a business partner. FIG. 8A shows a login screen where the care agent can enter their login id. In some embodiments, PDM module 112 can authenticate the care agent using a user ID and password database (not shown) the same as or separate from universal-ID DB 314. When the care agent is authenticated by PDM module 112, they can be prompted (e.g., via the screen in FIG. 8B) to enter the universal ID of the partner whose personal data will be managed by the care agent.

Figure 9A:
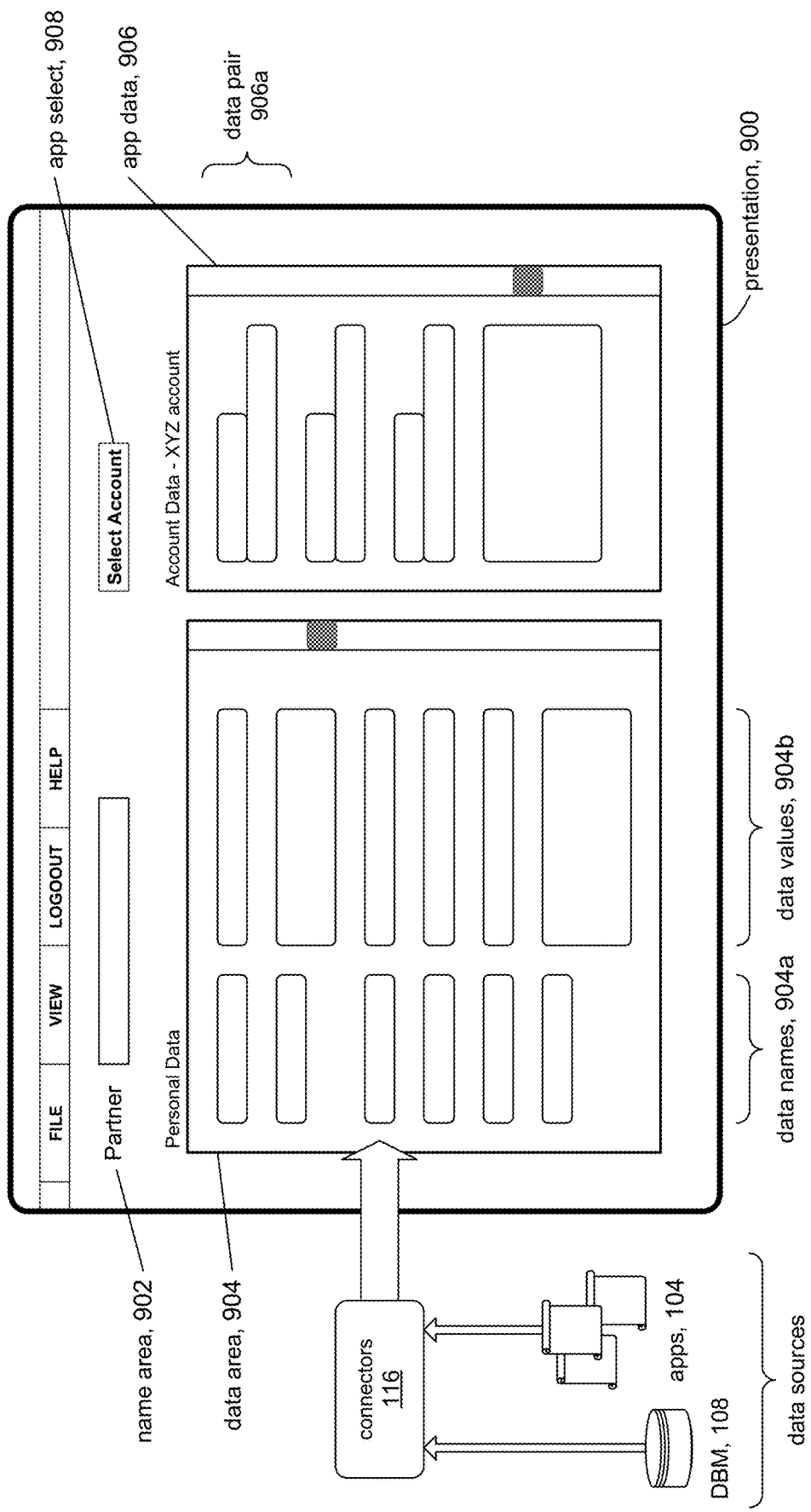
FIGS. 9A, 9B, 10 illustrate an example of a summary view for viewing personal data in accordance with some embodiments of the present disclosure.

FIG. 9A shows an illustrative example of a presentation 900 in the UI of PDM module 112 for viewing the business partner's personal data in accordance with some embodiments. Presentation 900 can be presented to any PDM user, whether a customer, a provider/supplier, or a customer care agent. In some embodiments, presentation 900 can include a name area 902 that identifies business partner whose personal data is being viewed. The business partner's personal data can be presented in data area 904. Each personal data item can be listed in area 904, where the name of each data item can be listed in a data names column 904*a* and the value is listed in a data values column 904*b*.

FIG. 9A shows that the source of the personal data includes central DBM 108, and the enterprise apps 104 that the business partner is associated with. The figure further illustrates that PDM module 112 uses connector modules 116 to communicate with enterprise apps 104 to obtain the personal data that is presented in data area 904.

Presentation 900 can further include a data area 906. In some embodiments, data area 906 can present data related to the business partner on a per enterprise application basis. In some embodiments, for example, PDM module 112 can use connector modules 116 to communicate with enterprise apps 104 to obtain such information. Consider an order processing application, for instance. Data area 906 can present information relating to various aspects of the business partner's pending orders. The data can be arranged in data pairs 906*a*, comprising a data type (e.g., Order Status.) and a data value (e.g., Shipped) for each item of data.

Presentation 900 can display an application selector 908 to allow the PDM user to select data for a given enterprise application. In some embodiments, for example, selector 908 can be a drop down menu, such as shown in FIG. 9B for instance.

Figure 9B:
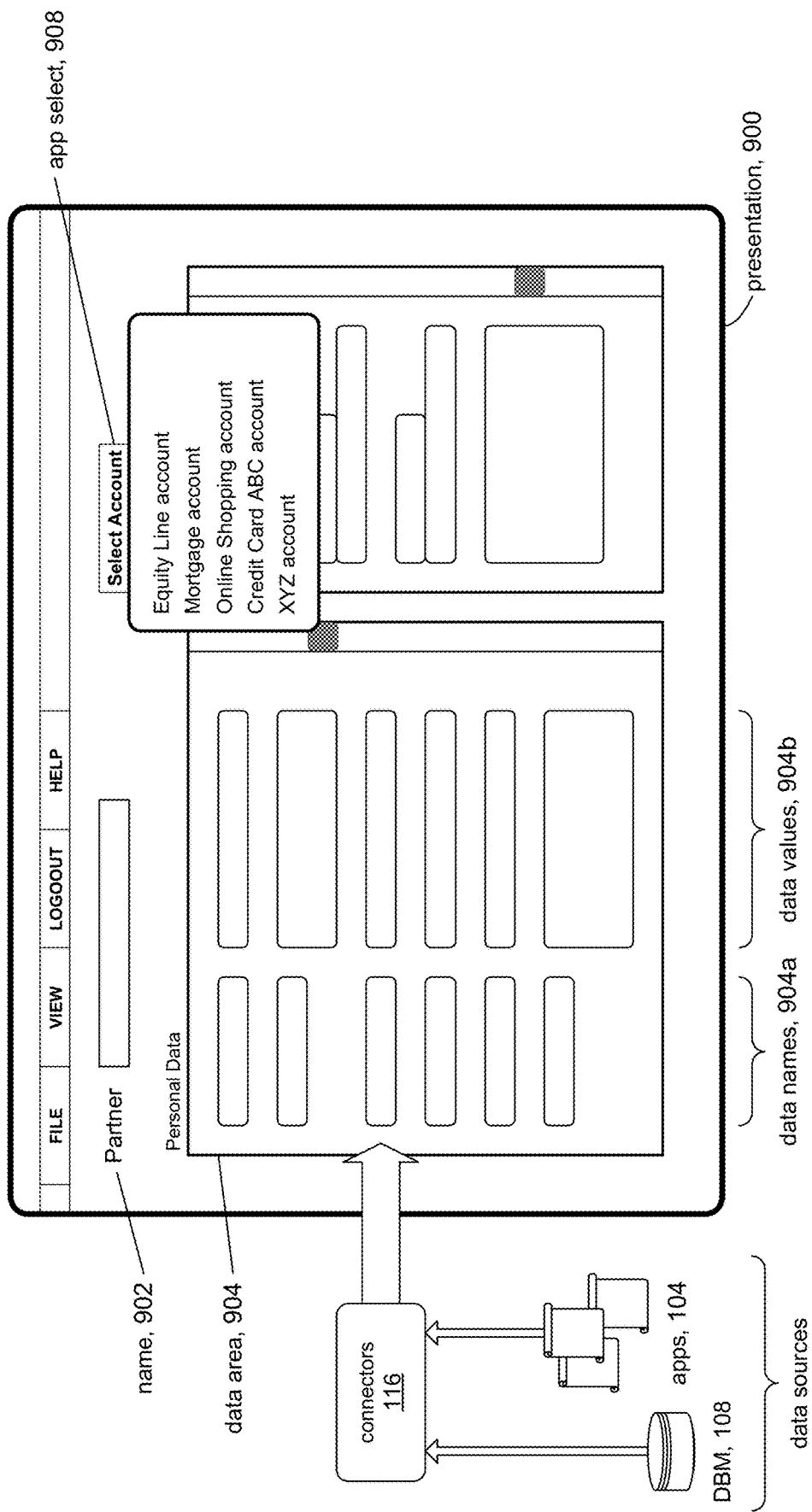
Figure 10:
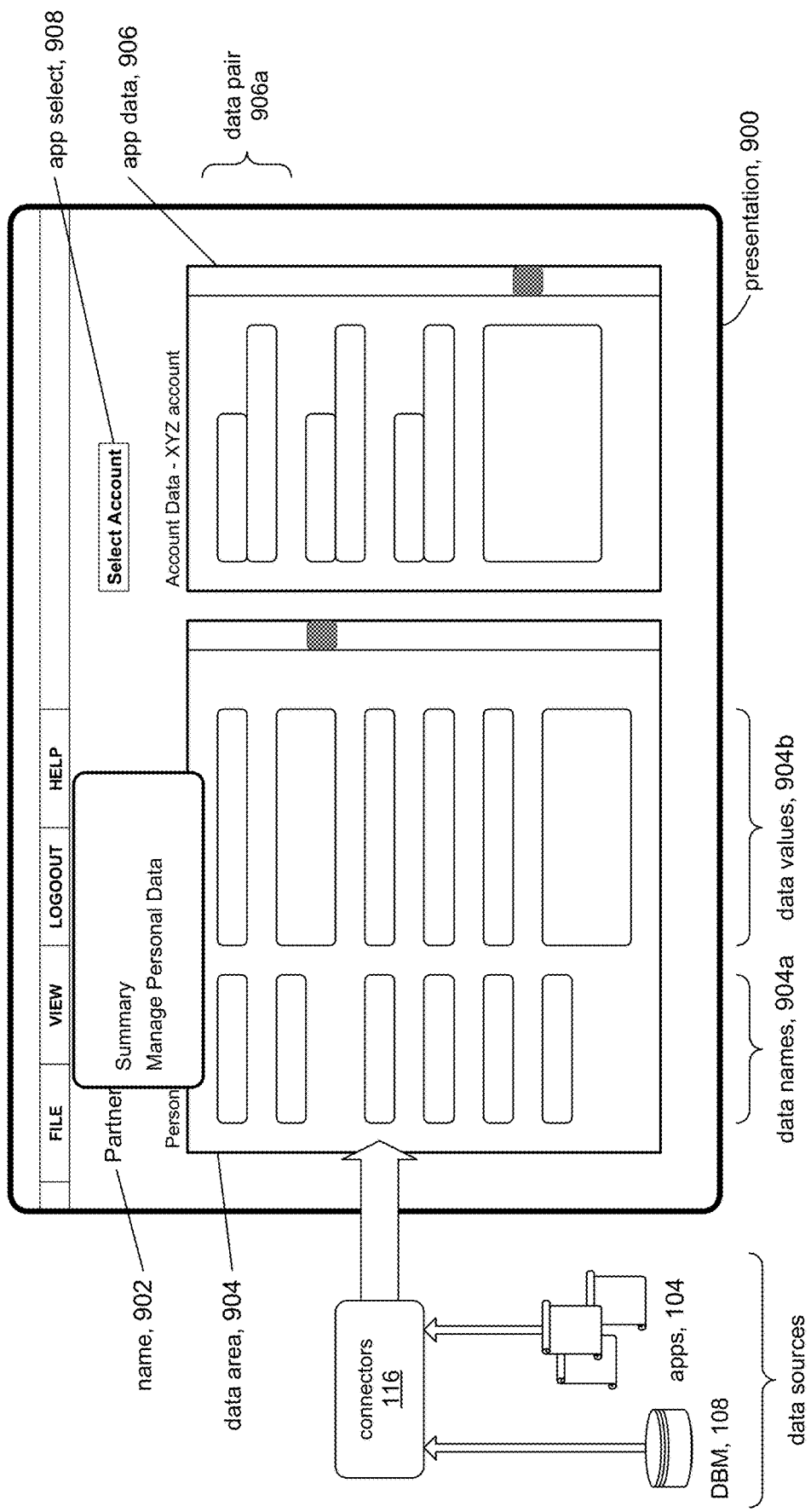

FIGS. 9A, 9B illustrate a summary view of the business partner's personal data and account information. Additional views can be provided. FIG. 10 shows a drop down menu from the VIEW menu, showing the selection of additional views. The drop down menu includes a Summary view, which is illustrated in FIGS. 9A 9B. The drop down menu shows a Manage Personal Data view to manage the business partner's personal data, and so on.

Figure 11:
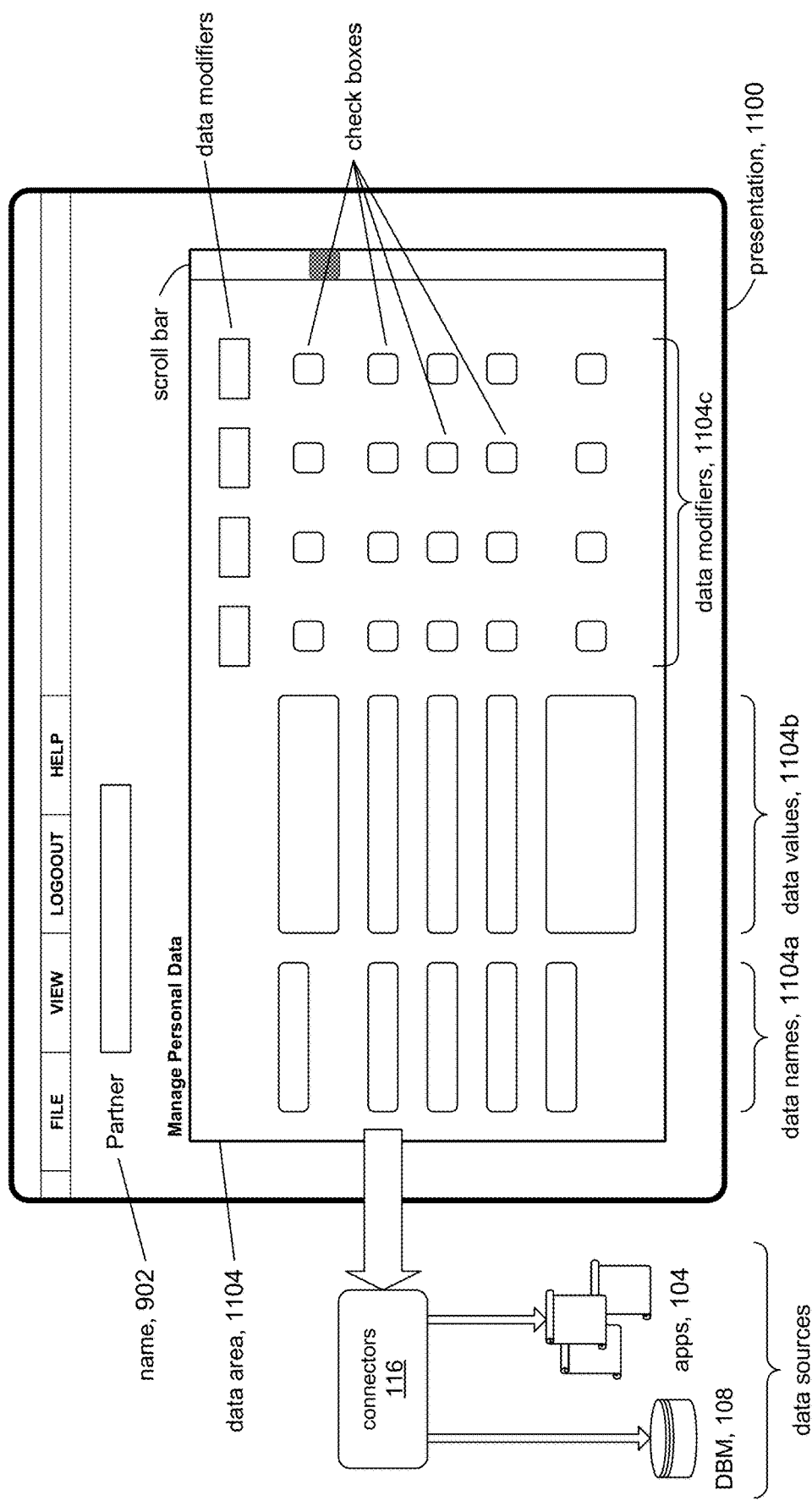
FIG. 11 illustrates an example of a data management view in accordance with some embodiments of the present disclosure.

FIG. 11 shows an illustrative example of a presentation 1100 for managing personal data in accordance with some embodiments. A data area 1104 can be provided to display the business partner's personal data. Each item of data can be identified by a name 1104*a* and the actual value 1104*b*. The PDM user can make updates to their personal data simply by scrolling through data area 1104 to find the data item of interest and editing the data. Data area 1104 can further include a data modifiers area 1104*b*, where PDM the user can select from among several data modifiers by checking or un-checking check boxes. A data modifier, for example, may indicate that a particular data item is deemed highly sensitive; e.g., religion, ethnicity, blood type, etc.

The present disclosure provides management of personal data that is used by the several enterprise applications in an enterprise. Using a set of connector modules, the personal data management (PDM) module can collect all the personal data from among the several enterprise applications into one location despite that that enterprise applications can be executing on separate different computing systems or computing platforms. The PDM module can significantly facilitate the user's management of their personal data by enabling a single UI solution to provide a unified experience and avoid having to navigate several UIs of several enterprise applications. Facilitating access to users' private data helps to ensure that an enterprise maintains compliance with applicable government regulations directed to the protection of private data, such as the GDPR.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer device comprising:
one or more computer processors;
a user interface; and
a non-transitory computer-readable storage medium comprising instructions, which when executed by the computer devices, control the one or more computer processors to be operable to:
instantiate a data management process to execute on the computer device; and
instantiate a plurality of connector processes to execute on the computer device, each connector process corresponding to an enterprise application among a plurality of enterprise applications,
wherein each of the enterprise applications execute on a computing platform separate from the computer device,
wherein the computer device provides access to personal data of a user of the plurality of enterprise applications, the personal data being used by the plurality of enterprise applications, the providing access including:
the data management process communicating with a central database (DB) to receive from the central DB the user's personal data;
the data management process communicating with the plurality of connector processes, each of the plurality of connector processes communicating with its corresponding enterprise application to receive from its corresponding enterprise application the user's personal data and providing the user's personal data to the data management process, wherein the data management process communicates with a first connector process to obtain an item of the user's personal data from an enterprise application corresponding to the first connector process, wherein that item of personal data is not stored in the central DB; and
the data management process sending the received personal data, including the user's personal data received from the central DB and the item of personal data not stored in the central DB and obtained from the first connector process, to the user interface,
wherein the plurality of enterprise applications communicate directly with the central database to make updates to personal data stored therein.

2. The computer device of claim 1, wherein the data management process communicates with the plurality of connector processes to obtain application-specific data from each corresponding enterprise application that the user is associated with.

3. The computer device of claim 1, wherein the data management process communicates with one or more of the connector processes to update the user's personal data on one or more corresponding enterprise applications.

4. The computer device of claim 1, wherein each connector process converts a data request from the data management process to produce one or more application-specific instructions that are executed by the corresponding enterprise application to obtain the user's personal data.

5. The computer device of claim 1, wherein the computing platform that each of the enterprise applications executes on is a cloud platform that is separate from a server based platform executing the computer device.

6. The computer device of claim 1, wherein one or more of the plurality of connector processes communicates with their corresponding enterprise application using a representational state transfer.

7. A non-transitory computer-readable storage medium having stored thereon computer executable instructions, which when executed by a computer device in an enterprise, cause the computer device to:
provide a user interface;
instantiate a data management process to execute on the computer device; and
instantiate a plurality of connector processes to execute on the computer device, each connector process corresponding to an enterprise application among a plurality of enterprise applications,
wherein each of the enterprise applications execute on a computing platform separate from the computer device,
wherein the computer device manages personal data of a user of the enterprise, the personal data being used by the plurality of enterprise applications, the managing including:
the data management process communicating with a central database (DB) to obtain the user's personal data;
the data management process communicating with the plurality of connector processes, each of the plurality of connector processes communicating with its corresponding enterprise application to receive from its corresponding enterprise application the user's personal data and providing the user's personal data to the data management process, wherein the data management process communicates with a first connector process to obtain an item of the user's personal data from an enterprise application corresponding to the first connector process, wherein that item of personal data is not stored in the central DB; and
the data management process sending the received personal data, including the user's personal data received from the central DB and the item of personal data not stored in the central DB and obtained from the first connector process, to the user interface,
wherein the plurality of enterprise applications communicate directly with the central DB to make updates to personal data stored therein.

8. The non-transitory computer-readable storage medium of claim 7, wherein the data management process communicates with the plurality of connector processes to obtain application-specific data from each corresponding enterprise application that the user is associated with.

9. The non-transitory computer-readable storage medium of claim 7, wherein the data management process communicates with one or more of the connector processes to update the user's personal data on one or more corresponding enterprise applications.

10. The non-transitory computer-readable storage medium of claim 7, wherein each connector process converts a data request from the data management process to produce one or more application-specific instructions that are executed by the corresponding enterprise application to obtain the user's personal data.

11. The non-transitory computer-readable storage medium of claim 7, wherein the computing platform that each of the enterprise applications executes on is a cloud platform that is separate from a server based platform executing the computer device.

12. The non-transitory computer-readable storage medium of claim 7, wherein one or more of the plurality of connector processes communicates with their corresponding enterprise application using a representational state transfer.

13. A method in a computer system for managing personal data in an enterprise, the method comprising:
the computer system providing a user interface; and
the computer system providing access to personal data of a user of a plurality of enterprise applications, the personal data being used by the plurality of enterprise applications, the providing access including:
a data management process that executes on the computer system communicating with a central database (DB) to receive from the central DB the user's personal data;
the data management process communicating with a plurality of connector processes that execute on the computer system to obtain the user's personal data, each connector process corresponding to one of the plurality of enterprise applications, wherein each of the enterprise applications executes on a computing platform separate from the computer system,
each of the plurality of connector processes communicating with its corresponding enterprise application to receive from its corresponding enterprise application the user's personal data and providing the user's personal data to the data management process, wherein the data management process communicates with a first connector process to obtain an item of the user's personal data from an enterprise application corresponding to the first connector process, wherein that item of personal data is not stored in the central DB; and
the data management process sending the received personal data, including the user's personal data received from the central DB and the item of personal data not stored in the central DB and obtained from the first connector process, to the user interface,
wherein the plurality of enterprise applications communicate directly with the central DB to make updates to personal data stored therein.

14. The method of claim 13, further comprising the data management process communicating with connector processes corresponding to enterprise applications that the user is associated with to receive application-specific data therefrom.

15. The method of claim 13, further comprising the data management process communicating with one or more of the connector processes to update the user's personal data on one or more corresponding enterprise applications.

16. The method of claim 13, wherein each connector process converts a data request from the data management process to produce one or more application-specific instructions that are executed by the corresponding enterprise application to obtain the user's personal data.

17. The method of claim 13, further comprising the data management process:
communicating with a userID process to obtain a user ID of the user from the userID process;
using the userID of the user to identify enterprise applications that the user is associated with.

18. The method of claim 13, further comprising the data management process:
communicating with a userID process to obtain user ID of the user;
mapping the userID to application-specific identifiers; and
using the application-specific identifiers to respective ones of the enterprise applications.

19. The method of claim 13, wherein the computing platform that each of the enterprise applications executes on is a cloud platform that is separate from a server based platform executing the computer device.

20. The method of claim 13, wherein one or more of the plurality of connector processes communicates with their corresponding enterprise application using a representational state transfer.

* * * * *